United States Patent [19]

Culp

[11] Patent Number: 4,612,619
[45] Date of Patent: Sep. 16, 1986

[54] ENERGY MANAGEMENT LOAD LEVELING

[75] Inventor: Charles H. Culp, Mundelein, Ill.

[73] Assignee: Honeywell Inc., Minneapolis, Minn.

[21] Appl. No.: 638,010

[22] Filed: Aug. 6, 1984

[51] Int. Cl.⁴ .................. G06F 15/46; H02J 13/00; G05B 19/00

[52] U.S. Cl. .................................. 364/492; 307/31; 307/38

[58] Field of Search ............... 364/492, 493, 494, 483; 307/31, 32, 35, 38–41

[56] References Cited

U.S. PATENT DOCUMENTS

| | | | |
|---|---|---|---|
| 4,136,392 | 1/1979 | Westphal et al. | 364/492 |
| 4,245,319 | 1/1981 | Hedges | 364/493 |
| 4,324,987 | 4/1982 | Sullivan, II et al. | 364/492 X |
| 4,347,576 | 8/1982 | Kensinger et al. | 364/493 |
| 4,382,284 | 5/1983 | Dressel et al. | 364/492 |
| 4,511,979 | 4/1985 | Amirante | 364/481 |
| 4,549,274 | 10/1985 | Lerner et al. | 364/492 |

Primary Examiner—Edward J. Wise
Attorney, Agent, or Firm—Trevor B. Joike

[57] ABSTRACT

A system for leveling energy consumption of loads being controlled by a duty cycle routine, the loads having on times and off times within a predetermined period of time established by the duty cycle routine, the system having a plurality of loads, a communication channel connected to each of the loads, and a controller connected to the communication channel, the controller determining a gap time during which no load is off, the gap time being a function of the period of time, the sum of all of the off times for each of the loads, and the number of loads, the controller scheduling the loads to be off, the off times being distributed over the period of time with a gap time existing between adjacent off times.

8 Claims, 3 Drawing Figures

ENERGY MANAGEMENT LOAD LEVELING

BACKGROUND OF THE INVENTION

The present invention relates to load leveling for leveling the energy consumption of loads in energy management systems and, more particularly, to an arrangement in which the gap times are provided between the off times of the loads of such systems.

Modern automated building air conditioning control systems typically use data processing and communication techniques for the control of the various loads and for the reporting of information from the various sensors located throughout the building. Digital processing and communication techniques have been used increasingly to reduce the installation and maintenance costs of air conditioning systems within buildings. Such systems usually incorporate one or more computers for processing information derived from the sensors and for controlling the air conditioning loads accordingly. The computers in such systems are controlled by energy management routines which attempt to reduce the energy costs of running the building's air conditioning and heating plants.

One such energy management routine which is often employed in such systems is duty cycling. Duty cycling recognizes that certain loads within a building can periodically be turned off in an effort to reduce the overall energy consumption for those loads. An interval or period of time is established during which the duty cycle program will determine the amount of off time and the amount of on time for that load during the interval. For example, an interval may be of 15 minutes duration. Each load is then assigned an on time and an off time during that period. A given load may have a 7½ minute on time and a 7½ minute off time during the assumed 15 minute interval. Thus, during the 15 minute interval between 8 a.m. and 8:15 a.m., the load will be operated on for 7½ minutes and off for 7½ minutes. During the next 15 minute interval between 8:15 a.m. and 8:30 a.m., the load will again be operated on for 7½ minutes and off for 7½ minutes.

More sophisticated duty cycling programs will adjust the on and off times according to changing conditions. As an example, temperature is often used in order to adjust the on and off times. As the temperature within a space increases, the on and off times of the loads within that space may have to be adjusted depending upon whether the space is in winter or summer control, whether the load is a source of heat or cooling, and whether the deviation between the temperature within the space and the desired temperature is excessive.

Although other energy management programs, such as peak demand limit and load shedding, may be provided in such systems, the present invention is directed particularly to load cycling. It is desirable, during a load cycling routine, to spread the off times uniformly throughout the period to minimize the energy consumption at any given instant in time during the interval. Thus, it is not desirable to have all of the loads on at a given instant of time. Although load leveling has been done in the prior art, prior art load leveling systems have not attempted to spread the off times uniformly throughout the interval so that there is a uniform gap time between adjacent off times, nor have such systems deenergized the loads by deenergizing first the load having the largest off time KW value, then the load having the smallest off time KW value, then the load having the next largest off time KW value, then the load having the next smallest off time KW value, and so on.

SUMMARY OF THE INVENTION

Accordingly, the present invention relates to a system for leveling energy consumption of loads being controlled by a duty cycle routine, the loads having on times and off times within a predetermined period of time established by said duty cycle routine, the system including a plurality of loads, a communication channel connected to each of said loads, and a controller connected to the communication channel, the controller determining a gap time during which no load is off, the gap time being a function of the period of time, the sum of all the off times for each of the loads, and the number of loads, the controller scheduling the loads to be off, the off times being distributed over the period of time with a gap time existing between adjacent off times.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
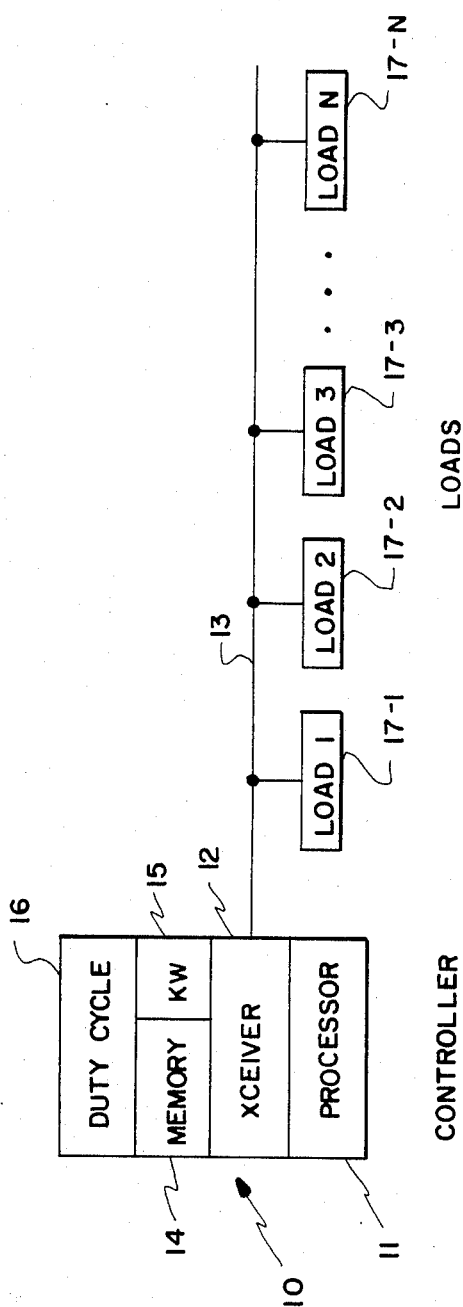
FIG. 1 is a block diagram of the system which can utilize the present invention.

In FIG. 1, controller 10 includes processor 11 which performs the processing function of controller 10 to carry out the present invention. Controller 10 also includes transceiver 12 connected to communication 13, memory 14 having stored therein the KW values for each of the loads connected to controller 10, the KW values being stored within portion 15 of memory 14, and a duty cycle routine 16 for performing the duty cycle routine of turning on and off one or more of the loads to which controller 10 is connected during each predetermined interval of time.

A plurality of loads 17-1 through 17-N are connected to communication channel 13. One or more of these loads may be duty cycled in accordance with duty cycle routine 16.

Figure 2:
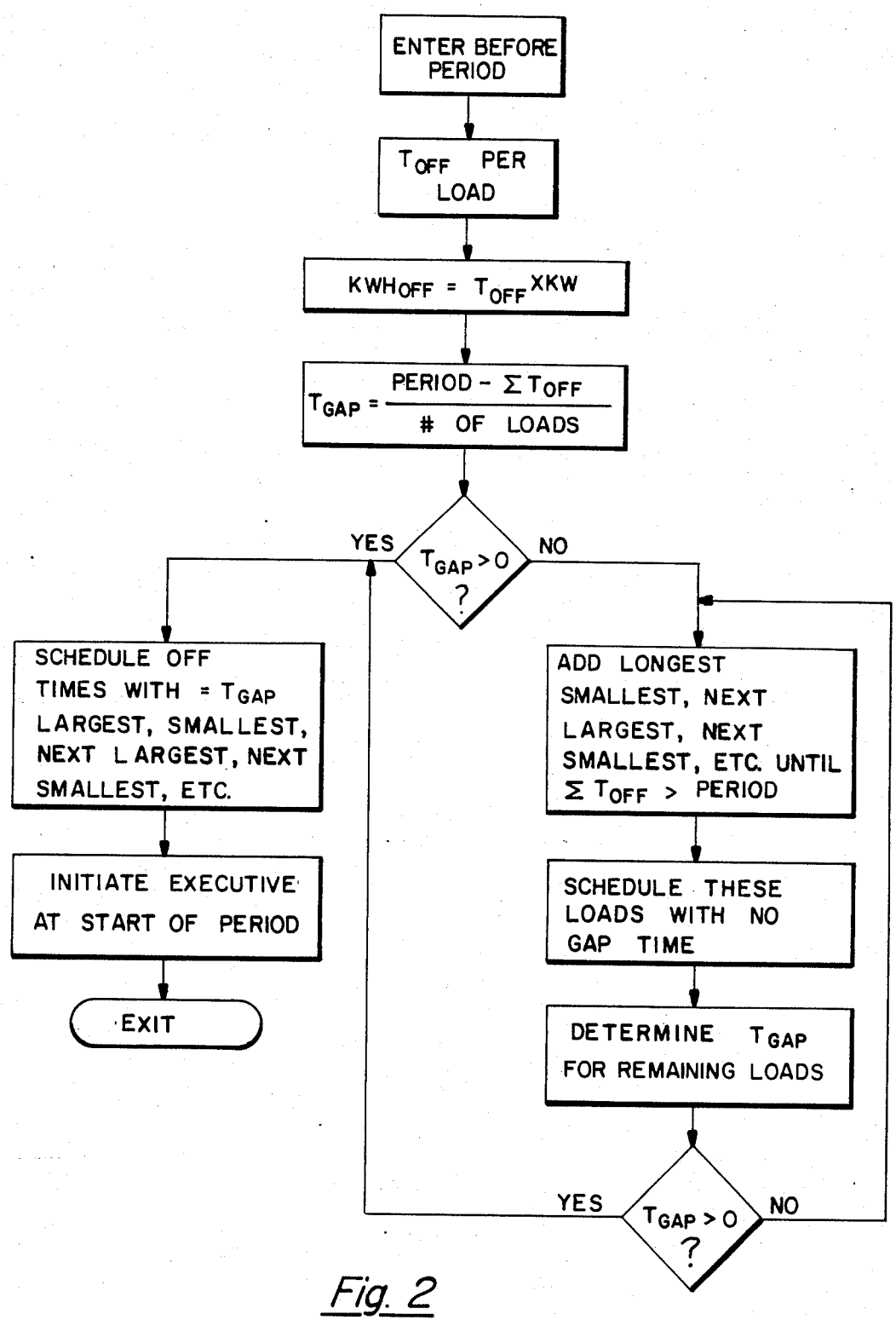
FIG. 2 is a flow chart showing the operation of the present invention.

The duty cycle energy management routine can be run continuously throughout the day or it may be run for a selected portion or portions of the day. During this selected portion, the intervals or portions of time during which the loads are turned on and off are selected. For example, the interval may be selected to be 15 minutes to that the controller will enter the load leveling routine just prior to the beginning of each period as shown in FIG. 2.

Once the load leveling routine is entered, the off time for each load will be determined by reference to the duty cycle routine. Next, the off time kilowatt value for each load will be determined by multiplying the off time for that load times its KW rating. Next, controller 10 will determine the gap time, i.e. the amount of time between off states for each of the loads under control of the load leveling program, by subtracting from the interval or period the total off time for all of the loads divided by the total number of loads.

Figure 3:
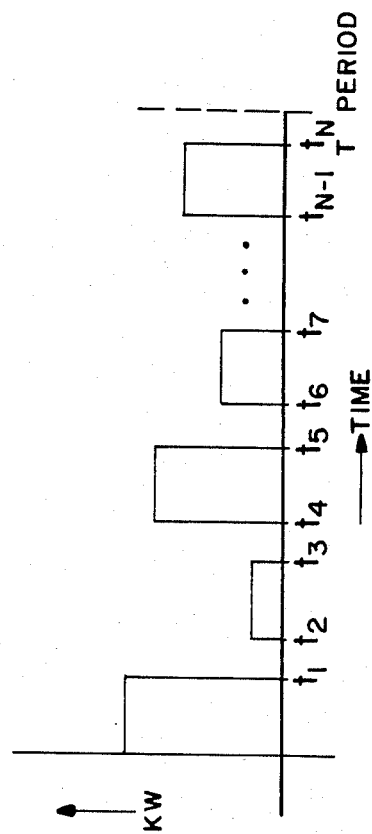
FIG. 3 is a graph in which the off times of the loads are scheduled in accordance with the present invention.

Controller 10 will then test whether or not this gap time is greater than or less than 0. If the gap time is greater than 0, then the loads are scheduled to be turned off in accordance with FIG. 3. The load first turned off during the upcoming period or interval is the load having the largest off time kilowatt rating. The next load to be turned off is the load with the smallest off time kilowatt rating. The next load to be turned off is the load having the next largest off time kilowatt rating, the next load to be turned off is the load having the next smallest off time kilowatt rating, and so on. The times between T1 and T2, T3 and T4, T5 and T6 and so on ending with the time between TN and the end of the period, are the gap times between corresponding adjacent off times. These gap times are substantially equal and are spread uniformly through the period. After all of these loads have been scheduled, controller 10 will then initiate execution of the schedule at the start of the upcoming period or interval. The system will then exit and will reenter for recalculation just prior to the next period or interval.

If, on the other hand, the gap time was not greater than 0, controller 10 will add the off times for the load having the largest off time KW, the load having the smallest off time KW, the load having the next largest off time KW, the load having the next smallest off time KW and so on until the next off time to be added will exceed the period. Controller 10 will then schedule these loads according to the procedure shown in FIG. 3 but without any gap time.

Controller 10 will then determine the gap time for the remaining loads. If this gap time is greater than 0, then controller 10 will proceed in accordance with the approach shown in FIG. 3 for scheduling these loads during the period with a uniform gap time between adjacent off times for the remaining loads. If the gap time does not exceed 0, then controller 10 proceeds to add up off times until the next off time will exceed the period and will schedule these loads according to the FIG. 3 approach but without a gap time.

Eventually, all the loads will be scheduled and execution of the schedule will be initiated at the start of the upcoming interval or period.

In this manner, not all of the loads are turned on or turned off at one time so that the duty cycle routine and other energy management routines such as load shedding and peak demand limit are complemented to maintain average energy consumption at a minimum.

The embodiments of the invention in which an exclusive property or right is claimed are defined as follows:

1. A system for leveling energy consumption of loads being controlled by a duty cycle routine, the loads having on times and off times within a predetermined period of time established by said duty cycle routine, said system comprising:
   a plurality of loads;
   communication means connected to each of said loads; and,
   controller means connected to said communication means, said controller means determining a gap time, said gap time being a function of said period of time, the sum of said off times for at least some of said loads, and the number of said at least some of said loads, said controller means scheduling said loads to be off, said off times of said at least some of said loads being distributed over said period of time with said gap time existing between adjacent off times of said at least some of said loads.

2. The system of claim 1 wherein said controller means determines said gap time by dividing the difference between said period of time and the sum of said off times for said at least some of said loads by the number of said at least some of said loads.

3. The system of claim 2 wherein said controller means includes means for determining which load has the largest off time KW value, which load has the smallest off time KW value, which load has the next largest KW value, which load has the next smallest KW value and so on, and means for scheduling, if said gap time is greater than 0, the loads to be turned off in the sequence of the load having the largest off time KW value, the load having the smallest off time KW value, the load having the next largest off time KW value, the load having the next smallest off time KW value and so on.

4. The system of claim 2 wherein said controller means comprises means for determining an off time KW value for each of said loads, and means for adding said off time KW values, if said gap time is not greater than 0, until the next off time to be added causes the sum of said off times to exceed said period of time, means for scheduling the off times of the loads thus determined to be turned off in order of the load having the largest KW value, the load having the smallest KW value, the load having the next largest KW value, the load having the next smallest KW value and so on without gap times therebetween, means for determining the gap time of the remaining loads and, if this last computed gap time is greater than 0, for determining the off time KW values of the remaining loads and for scheduling these loads to be turned off in order of the load having the largest off time KW value first, the load having the smallest off time KW value second, the load having the next largest off time KW value third, the load having the next smallest off time KW value fourth and so on.

5. A system for leveling energy consumption of loads being controlled by a duty cycle routine, the loads having on times and off times within a predetermined period of time established by said duty cycle routine, said system comprising:
   a plurality of loads;
   communication means connected to each of said loads; and,
   controller means connected to said communication means, said controller means determining a gap time, said gap time being a function of said period of time, the sum of all said off times for each of said loads, and the number of loads, said controller means determining an off time KW value for each of said loads, said controller means scheduling, if said gap time is greater than 0, the loads to be off with said load having the largest off time KW value first, the load having the smallest off time KW value second, the load having the next largest off time KW value third, the load having the next smallest off time KW value fourth, and so on, said off times being distributed over said period of time with a gap time existing between adjacent off times.

6. The system of claim 5 wherein said contoller means determines said gap time by dividing the difference between said period of time and the sum of said off times for said at least some of said loads by the number of said at least some of said loads.

7. A system for leveling energy consumption of loads being controlled by a duty cycle routine, the loads having on times and off times within a predetermined period of time established by said duty cycle routine, said system comprising:

a plurality loads;

communication means connected to each of said loads; and, controller means connected to said communication means, said controller means determining a gap time as a function of said period of time, the sum of all said off times for each of said loads, and the number of loads, said controller means determining an off time KW value for each of said loads, said controller means, if said gap time is not greater than 0, adding the off times of said load having the largest off time KW value, the load having the smallest off time KW value, the load having the next largest off time KW value, the load havng the next smallest off time KW value and so on until the next off time to be added will cause the sum of the off times to exceed the period, said controller means scheduling said loads, exclusive of said load having the off time which will cause said sum to exceed said period, to be turned off in sequence beginning with said load having said largest off time KW value, then said load having said smallest off time KW value, then said load having the next largest off time KW value, then the load having the next smallest off time KW value and so on with no gap time between adjacent off times, said controller means then redetermining said tap time as a function of said period of time, the remainder of said loads, and the total number of remaining loads, said controller means rescheduling the sequence in which the remaining loads are to be turned off, adjacent off times for said remaining loads being separated by said gap time.

8. The system of claim 7 wherein said controller means determines said gap time by dividing the difference between said period of time and the sum of said off times for said at least some of said loads by the number of said at least some of said loads.

* * * * *

UNITED STATES PATENT OFFICE
CERTIFICATE OF CORRECTION

PATENT NO. : 4,612,619

DATED : September 16, 1986

INVENTOR(S) : Charles H. Culp

It is certified that error appears in the above-identified patent and that said Letters Patent are hereby corrected as shown below:

In Column 6, line 8, delete "tap" and insert --gap--.

Signed and Sealed this

Twenty-fifth Day of November, 1986

Attest:

DONALD J. QUIGG

Attesting Officer      Commissioner of Patents and Trademarks